United States Patent
El Housni et al.

(10) Patent No.: US 11,921,623 B2
(45) Date of Patent: Mar. 5, 2024

(54) DEVICE AND METHOD FOR TESTING A SEQUENCE GENERATED BY A RANDOM NUMBER GENERATOR

(71) Applicant: SECURE-IC SAS, Cesson-Sévigné (FR)

(72) Inventors: Youssef El Housni, La Garenne-Colombes (FR); Florent Lozac'H, Pace (FR)

(73) Assignee: SECURE-IC SAS, Cesson-Sevigne (FR)

( * ) Notice: Subject to any disclaimer, the term of this patent is extended or adjusted under 35 U.S.C. 154(b) by 363 days.

(21) Appl. No.: 17/414,913

(22) PCT Filed: Dec. 20, 2019

(86) PCT No.: PCT/EP2019/086851
§ 371 (c)(1),
(2) Date: Jun. 16, 2021

(87) PCT Pub. No.: WO2020/136142
PCT Pub. Date: Jul. 2, 2020

(65) Prior Publication Data
US 2022/0066918 A1 Mar. 3, 2022

(30) Foreign Application Priority Data
Dec. 27, 2018 (EP) .................... 18306855

(51) Int. Cl.
*G06F 11/00* (2006.01)
*G06F 11/36* (2006.01)
*G06F 17/18* (2006.01)

(52) U.S. Cl.
CPC ...... *G06F 11/3692* (2013.01); *G06F 11/3684* (2013.01); *G06F 17/18* (2013.01)

(58) Field of Classification Search
CPC ............ G06F 11/3692; G06F 11/3684; G06F 11/0751; G06F 11/0754; G06F 11/076; G06F 7/58; G06F 7/588; G06F 17/18
See application file for complete search history.

(56) References Cited

U.S. PATENT DOCUMENTS

| | | | |
|---|---|---|---|
| 2003/0200238 A1* | 10/2003 | Hars | G06F 17/145 708/250 |
| 2015/0199175 A1* | 7/2015 | Wang | G06F 7/58 708/250 |
| 2018/0136907 A1 | 5/2018 | Bohdan et al. | |

OTHER PUBLICATIONS

Veljkovic, Filip et al., Low-Cost Implenetations of On-the-Fly Tests for Random Number Generators, 2012, EDAA (Year: 2012).*

(Continued)

*Primary Examiner* — Marc Duncan
(74) *Attorney, Agent, or Firm* — BakerHostetler

(57) ABSTRACT

Embodiments provide a device for testing a bit sequence generated by a Random Number Generator, wherein the device is configured to apply one or more statistical tests to the bit sequence, in response the detection of N bits generated by the Random number generator, each statistical test providing at least one sum value derived from the bits of the sequence, the testing device comprising: a comparator for comparing at least one test parameter related to each statistical test to one or more thresholds; a validation unit configured to determine if the bit sequence is valid depending on the comparison made by the comparator for each statistical test; wherein at least one of the test parameter and the at least one threshold is determined from N and from a target error probability.

14 Claims, 2 Drawing Sheets

(56) References Cited

OTHER PUBLICATIONS

Yang, Bohan et al., Embedded HW/SW Platform for On-the-Fly Testing of True Random Number Generators, 2015, EDAA (Year: 2015).*

Suresh, Vikram B, On-chip Lightweight Implementation of Reduced NIST Randomness Test Suite, 2013, IEEE (Year: 2013).*

Rukhin, et al., "A statistical test suite for random and pseudorandom number generators for cryptographic applications", NIST, Special Publication 800-22 Revision 1a, Apr. 30, 2010.

Schindler, "Efficient Online Tests for True Random No. Generators", Cryptographic Hardware and Embedded Systems—CHES 2001, vol. 2162, pp. 103-117, 2001.

* cited by examiner

DEVICE AND METHOD FOR TESTING A SEQUENCE GENERATED BY A RANDOM NUMBER GENERATOR

CROSS-REFERENCE TO RELATED APPLICATIONS

This application is a National Stage of International patent application PCT/EP2019/086851, filed on Dec. 20, 2019, which claims priority to foreign European patent application No. EP 18306855.0, filed on Dec. 27, 2018, the disclosures of which are incorporated by reference in their entirety.

TECHNICAL FIELD

The invention generally relates to a device and a method for testing a sequence generated by a Random Number Generator.

BACKGROUND

Random Number Generators are used to generate a set of random numbers (in the form of bit streams) for use in a number of systems. For example, a Random Number Generator can be used in a cryptographic system to generate random cryptographic keys which are used to transmit data securely.

Random number generators comprise Hardware Random Number Generators, also called True Random Number Generators (TNRG), which generate a set of numbers from a physical process, rather than a computer program (non-deterministic source), and Pseudorandom Number Generators which generate numbers from a deterministic source such as a deterministic algorithm.

TNRG can be based on microscopic phenomena that generate low-level, statistically random "noise" signals, such as thermal noise or a shot noise, the photoelectric effect, involving a beam splitter, and other quantum phenomena. A TNRG generally comprises a transducer which converts quantities or data derived from the physical phenomena into an electrical signal, an amplifier, additional components configured to increase the amplitude of the random fluctuations up to a measurable level, and an analog to digital converter configured to convert the output thus obtained into a digital number (for example a binary digit 0 or 1). The TRNG then repeatedly samples the randomly varying signal to obtain a series of random numbers.

The quality of random numbers generation is paramount for implementation of cryptographic systems (for example for key generation, authentication protocols, padding, digital signature, encryption algorithms). In such applications, security closely depends on the quality of the generated random numbers.

Indeed, many attacks target weaknesses in the implementation of the cryptographic system. Such weaknesses can result from the quality of the generated random numbers and be exploited by attackers to try to break the system.

Several testing methods and systems exist for testing the quality (in particular the randomness) of generated random numbers, most of them being based on the statistical tests.

Such tests are applied to check whether a sequence of randomly acquired numbers has two main statistical properties:
the generated values should be uniformly distributed and,
the generated values should be independent from previously generated values.

In recognition of this, standardization entities like NIST and BSI has established a statistical test suite given a binary sequence of 20000 bits. The aim of this document is to provide a mathematical interpretation of the tests and to establish generalized mathematical formulas given a sequence of N bits, an error probability and other parameters.

There is currently a need to test the set of random number generated by the TNRG as it may affect the performance of the system using such random numbers such as the AIS31, FIPS140-1, NIST, and DIEHARD tests.

Standardization entities like NIST and BSI has established a statistical test suite given a binary sequence of a fixed number of bits (20000 bits).

In existing approaches, the statistical tests are thus applied each time the TRNG produces a sequence of 20000 bits, the test calculating different sums based on the sequence. Such sums are then compared to predefined and fixed threshold, and depending on the result of the comparison it is decided whether to accept or reject the sequence. The thresholds used to perform the comparison are predefined as a function of a fixed error probability.

Existing testing methods and devices introduce incontrollable latency. Further, they cannot be adapted to address a target error probability.

There is accordingly a need for improved method and devices for testing the sequence of bits generated by a Random Number Generator.

SUMMARY OF THE INVENTION

To address these and other problems, there is provided a device for testing a bit sequence generated by a Random Number Generator, the device being configured to apply one or more statistical tests to the bit sequence, in response the detection of N bits generated by the Random number generator, each statistical test providing at least one sum value derived from the bits of the sequence. The testing device may comprise:
a comparator for comparing at least one test parameter related to each statistical test to one or more thresholds;
a validation unit configured to determine if the bit sequence is valid depending on the comparison made by the comparator for each statistical test;
the at least one of the test parameter and the at least one threshold is determined from N and from a target error probability.

In some embodiments, the at least one or more statistical tests applied to the sequence may comprise a set of statistical tests providing at least one sum value derived from the bits of the sequence, which provides the at least one test parameter for each statistical test, the device further comprising:
a threshold determination unit for determining, for each statistical test of the set of statistical test, a lower threshold and a higher threshold from N and from the target error probability in association with each sum value;
the comparator being configured to compare, for each statistical test, each sum value to the associated lower threshold and higher threshold.

In such embodiments, the comparator may be configured to output a validation bit for a statistical test, if each sum value is strictly superior to the associated lower threshold and strictly inferior to the higher threshold.

Further, the validation unit may be configured to reject the bit sequence if at least one sum value for a statistical test is inferior or equal to the associated lower threshold or superior or equal to the corresponding higher threshold.

In one embodiment, the statistical tests may comprise the AIS Monobit Test which provides a sum value $T_1$, the corresponding lower threshold $L_1$ and the higher threshold $H_1$ being equal to:

$$L_1 = \frac{N}{2} - \sqrt{\frac{N}{2}} \times \text{erfc}^{-1}(\alpha), \text{ and}$$

$$H_1 = \frac{N}{2} + \sqrt{\frac{N}{2}} \times \text{erfc}^{-1}(\alpha),$$

with $\alpha$ representing the target error probability.

In one embodiment, the statistical tests may comprise the AIS Poker Test, the testing device determining a sum value $T_2$. The corresponding lower threshold $L_2$ and the higher threshold $H_2$ are equal to:

$$L_2 = \left(\chi^2_{(2^M-1)}(0.3 \times \alpha) + \left\lfloor \frac{N}{M} \right\rfloor\right) \times \frac{\left\lfloor \frac{N}{M} \right\rfloor}{2^M}, \text{ and}$$

$$H_2 = \left(\chi^2_{(2^M-1)}(1 - 0.7 \times \alpha) + \left\lfloor \frac{N}{M} \right\rfloor\right) \times \frac{\left\lfloor \frac{N}{M} \right\rfloor}{2^M},$$

with M representing the length of the contiguous blocks in the bit sequence and a representing the error probability.

In an embodiment, the statistical tests may comprise the AIS runs Test, the testing device determining a sum value $T_{3(N,k)}$ for each run of length k, for the runs test, the lower threshold $L_{3,k}$ and the higher threshold $H_{3,k}$ for each run of length k being equal to:

$$L_{3,k} = \mu_{N,k} - \sqrt{2 \times \mu_{N,k}} \times \text{erfc}^{-1}(\alpha)$$

$$H_{3,k} = \mu_{N,k} + \sqrt{2 \times \mu_{N,k}} \times \text{erfc}^{-1}(\alpha),$$

with $\alpha$ representing the target error probability and $$\mu_{N,k} = \frac{N}{2^{k+2}}.$$

In some embodiments, the at least one or more statistical tests applied to the sequence comprise an additional set of statistical tests, the testing device determining, for each statistical test, a test parameter determined from N and from the error probability.

In particular, the statistical tests may comprise the AIS Longest Run Test, the test parameter being a run length k, the length k being determined according to the following equation:

$$k = -\log_2\left(1 - e^{\frac{\ln(\alpha)}{N}}\right),$$

where a designates the long run probability. The comparator may then compare the test parameter k to the run of maximal length.

In one embodiment, the bit sequence length N may be changed between one or more clock cycles.

A new value for the error probability and the number N may be received at different times or simultaneously.

There is further provided a system implemented on at least one integrated circuits, the system comprising a device using a random bit sequence generated by a random number generator, wherein the device further comprises a testing device according to any of the preceding embodiments, for testing each random bit sequence generated by the random number generator before using it.

There is further provided a method for testing a bit sequence generated by a Random Number Generator, wherein the method comprises applying one or more statistical tests to the bit sequence, in response the detection of N bits generated by the Random number generator, each statistical test providing at least one test parameter from the bits of the sequence, the testing method comprising comparing at least one test parameter related to each statistical test to one or more thresholds; determining if the bit sequence is valid depending on the comparison performed for each statistical test in the comparing step. At least one of the test parameter and the at least one threshold is determined from N and from a target error probability.

The invention accordingly enables control of the latency/debit of Random Number Generator implemented in a given system.

Embodiments of the invention thus provide a flexible and fully latency-controllable RNG throughout all stages of operation.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

Additionally, the detailed description is supplemented with Exhibit E1. This Exhibit is placed apart for the purpose of clarifying the detailed description, and of enabling easier reference. It nevertheless forms an integral part of the description of the present invention.

DETAILED DESCRIPTION

Embodiments of the present invention provide a device and a method for testing the sequence of random numbers generated by a Hardware Random Number Generator such as a TRNG (True Random Number Generator). In the following description, the Random Number Generator will be also referred to as a RNG.

Figure 1:
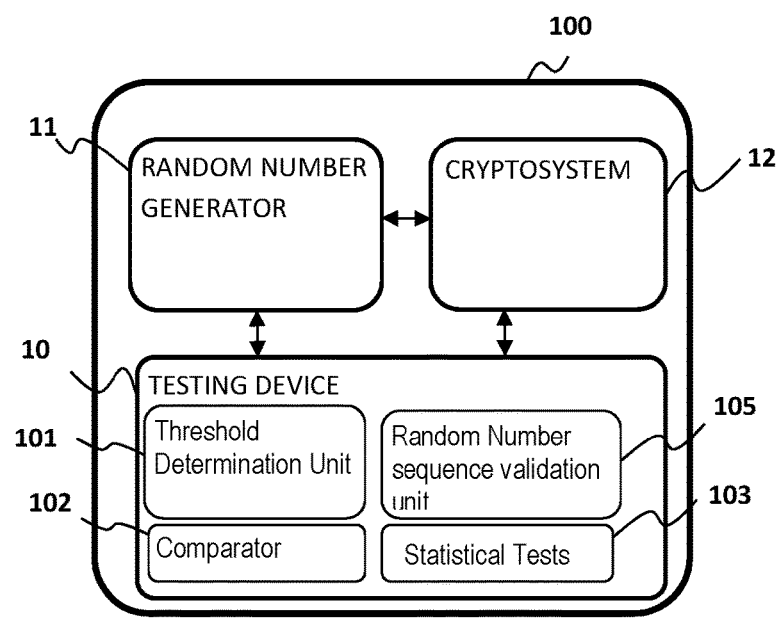
FIG. 1 depicts a device for testing a random number sequence generated by a Random Number Generator, according to some embodiments.

Referring to FIG. 1 there is shown an exemplary operational environment 100 of the testing device 10 comprising a cryptosystem 12 using sequences of random numbers generated by a Hardware Random Number Generator 11 for generating keys, performing authentication, generating signatures, and/or performing encryption, etc.

The testing device 10 is configured to test the quality of the random number sequences generated by the Random Number Generator 11 a set of statistical tests 103 comprising one or more statistical tests $T_1, T_2, \ldots, T_p$, with P being at least equal to one.

It should be noted that the invention is not limited to the use of the testing device 10 in a cryptosystem 12 but may be used generally in any system or device using a sequence of random numbers generated by a Hardware RNG 11. The system 100 and/or the system 12 can be implemented on one or more integrated circuits.

The following description of some embodiments will be made with reference to a cryptosystem 12 for illustration purpose only.

The statistical test Test_j may be configured to test the statistical properties that are required by the cryptosystem, including backward and forward unpredictability property of the Random Number Generator 11.

Exemplary statistical tests Tj include for example AIS, tests testing entropy increase per generated number, etc.

More specifically, the testing device 10 may be configured to receive, during operation of the system 100, a desired error probability α and a frequency number N defining a number of bits of a sequence generated by the RNG 11. N may be inferior to the maximal number of bits M that the RNG 11 can generate. In particular, N can be adjusted during the operation of the system depending on a number of criteria. Accordingly, N may be changed between one or more clock cycles. Advantageously, the value N may be different from a predefined fixed value and may accordingly take a value different from the value N'=20000 conventionally used to activate the statistical tests. A new value for the error probability α and the frequency number N may be received at different times or simultaneously.

As used herein, the desired error probability (also referred to herein as the "significance level" or "target error probability") refers to the probability of error of the test made on a sequence generated by the RNG 11, that is the probability that the test made by the testing device on a given sequence generated by the RNG 11, using the set of statistical tests 103, returns an erroneous result. The desired error probability α is thus defined as the probability of the test rejecting a sequence generated by the RNG 11, given that it was truly random.

The RNG 11 may be activated to generate a sequence of random numbers comprising a number of bits from an entropy source, using the current value of the desired error probability r and the frequency number N for use by the cryptosystem 12 (for example for key generation).

The testing device 10 may be configured to test a bit sequence generated by a Random Number Generator 11, by applying one or more statistical tests 103 to the bit sequence, in response the detection of N bits generated by the Random number generator. Advantageously the number N and the target probability may be varied depending on the application of the invention (N may be defined as small as possible if fast processing time is needed or increased if the test is required to limit false positive as much as possible).

Each statistical test 103 provides at least one test parameter derived from the bits of said sequence.

The testing device may comprise a comparator 102 configured to compare the test parameter(s) related to each statistical test to one or more thresholds and a Random Number sequence validation unit 105 configured to determine if the N-bit sequence is valid depending on the comparison made by the comparator 102 for the statistical tests.

The Random Number sequence validation unit 105 may be configured to reject or validate the N-Bit Random Number Sequence using the results of the statistical tests 103 applied to the sequence. In such embodiment, the comparator 102 may return the resulting values $O_j$ to the Random Number sequence validation unit 105.

In one embodiment, the Random Number sequence validation unit 105 may be configured to validate the N-Bit Random Number Sequence only if, for all the P statistical tests, condition (1) applied to each sum value obtained by the execution of the statistical test is satisfied for the considered N-bit sequence (i.e. $O_j = O_{j,2}$ for j=1 to K).

Each statistical test 103 may be a statistical test for testing randomness in the N-bits binary sequence generated by the RNG 11.

Advantageously, at least one of the test parameter and the threshold(s) is determined from N and from a target error probability.

The testing device 10 thus executes a set of P statistical tests (P being at least equal to 1), in response to the generation of a N-bit random number sequence (that is in response to the detection of a number of bit equal to N in the random number sequence), as the random bit are received from the Random Number Generator 11. The set of P statistical tests may be stored in a storage unit 103.

In some embodiments, the set of statistical tests 103 comprise a set of statistical tests, which each are used to determine one or more sum values (several values if the test comprises several runs) derived from the N bits of the random number sequence and the error probability α.

The testing device 10 may further comprise a threshold determination unit 101 configured to determine at least one threshold pair comprising a lower threshold $L_j$ and a higher threshold $H_j$, for each test Test_j, the lower threshold $L_j$ and the higher threshold $H_j$ depending on the parameter N and on a significant level parameter α.

The testing device 10 may be configured to check, for each statistical test Test_j, whether each value (sum result) returned by the considered statistical test Test_j, meets a condition related to a corresponding threshold pair (lower threshold $L_j$ and higher threshold $H_j$) thus determined.

In such embodiments, the comparator 105 may be configured to compare each sum result returned by a statistical test Test_j with the lower threshold $L_j$ and to the higher threshold $H_j$ of the associated pair.

In one embodiment, the comparator 105 of the testing device may be configured to determine whether each value Tj (sum result) returned by a statistical test Test_j is strictly higher than the lower threshold Lj and strictly inferior to the higher threshold Hj of the associated threshold pair. The condition that is checked for the value Tj based on the corresponding threshold pair (lower threshold $L_j$ and higher threshold $H_j$) may be expressed as:

$$L_j < T_j < H_j \quad (1)$$

It should be noted that in some embodiments, a plurality of sum values may be determined for each statistical test (for example if the test comprises several runs), and for each value a corresponding threshold pair is determined, condition (1) being tested for each sum value and each corresponding threshold pair.

The comparator 105 may return a resulting value $O_j$ for each test Test_j applied to the N-Bit sequence, set to the first value $Oj_{,1}$ if the test condition of Equation (1) is not satisfied or a second value $Oj_{,2}$ if the test condition of Equation (1) is satisfied.

To facilitate understanding of some embodiments of the invention, the following definitions are provided:

As used herein, a 'Null hypothesis $H_0$' refers the statement that a provided sequence is truly random.

A 'test statistic S' refers to a numerical summary that reduces the observed data to one value.

A 'p-value' refers to the probability that, when $H_0$ is true, the statistical test would be the same as or of greater magnitude than the actual observed results.

A 'significance level' $\alpha$ (also referred to herein as the "error probability") refers to the probability of rejecting $H_0$, given that it were true.

Given such definitions, a statistical test is conducted as follows:
If p-value$\geq \alpha$ then $H_0$ is accepted;
If p-value$<\alpha$ then $H_0$ is rejected.

The p-value may be computed given the statistical model of the test statistic S.

Such model may apply to all statistical tests used to link empirical data of a real-world RNG to a stochastic model.

The set of statistical test 103 may comprise for example one or more tests of the AIS31 Tests Suite which comprises:
A Monobit Test;
A Poker Test;
A Runs Test;
A Longest Run Test.

The following description of some embodiments will be made with reference to one or more tests of the AIS31 suite for illustration purpose only.

In the following description a random number sequence comprising bits $b_i$ and having a length N is considered.

In one embodiment, the set of statistical test 103 may comprise the Monobit Test. The Monobit Test is configured to determine the proportion of the number of ones and zeros in a given bit sequence. For a random sequence, it is expected that the average number of ones (and consequently zeros) in the sequence is ½.

According to one embodiment, the AIS31 Monobit test examines a sequence of N bits by calculating the sum $T_1$ as follows:

$$T_1 = \sum_{i=1}^{N} b_i$$

According to one embodiment of the invention, a set of statistical parameters $\{H_0, S_N, \alpha\}$ may be defined to run the monobit test:

$H_0$: The hypothesis is made that the generated bit sequence is random;
A parameter $S_N$ is defined such that:

$$S_N = \sum_{i=1}^{N} (2 \times b_i - 1) \quad (2)$$

The error probability $\alpha$ is set to:

$$\alpha = 9.6 \times 10^{-7} \quad (3)$$

the observation to be tested:

$$S_{obs} = \frac{|S_N|}{\sqrt{2N}} \quad (4)$$

Considering $$S_{obs} = \frac{|S_N|}{\sqrt{2N}}$$

(observation to be tested), the reference distribution of such observation is half normal for a large value of N. As used herein, a half normal distribution refers to a normal distribution with mean 0 (zero). A definition of a normal distribution is provided in Exhibit E1.1. If the sequence is random, then the plus and minus ones will tend to cancel each other out so that the test statistic is about 0.

The p-value (probability that, when $H_0$ is true, the statistical test would be the same as or of greater magnitude than the actual observed results) is the given by:

$$p\text{value} = \text{erfc}(S_{obs}) \quad (5)$$

In Equation (1), erfc(z) represents the complementary Gauss error function:

$$\text{erfc}(z) = \frac{2}{\sqrt{\pi}} \int_{Z}^{+\infty} e^{-u^2} du \quad (6)$$

For a random variable X that is half-normally distributed, erfc(x) is the probability of X falling out of the range [-x,x].

According to the testing method, $H_0$ is accepted if:

$$p\text{value} \geq \alpha \quad (7)$$

According to Equations (4) and (5), equation (7) can be rewritten:

$$\text{erfc}\left(\left|\frac{S_N}{\sqrt{2N}}\right|\right) \geq \alpha \quad (8)$$

As $\text{erfc}^{-1}$ is a decreasing function in:

$$\left|\frac{S_N}{\sqrt{2N}}\right| \leq \text{erfc}^{-1}(\alpha); \quad (9)$$

$$|S_N| \leq \sqrt{2N} \times \text{erfc}^{-1}(\alpha); \quad (10)$$

According to Equation (2):

$$|S_N| = \sum_{i=1}^{N} (2 \times b_i - 1) = 2 \times \sum_{i=1}^{N} b_i - \sum_{i=1}^{N} 1 = 2 \times T_1 - N \quad (11)$$

Equation (10) can be then rewritten as:

$$|2 \times T_1 - N| \leq \sqrt{2N} \times \text{erfc}^{-1}(\alpha) \quad (12)$$

By dividing equation (12) by two, the following inequality is obtained:

$$\left|T_1 - \frac{N}{2}\right| \leq \sqrt{\frac{N}{2}} \times \text{erfc}^{-1}(\alpha) \quad (13)$$

Given N, the length of the sequence:

$$\frac{N}{2} - \sqrt{\frac{N}{2}} \times \text{erfc}^{-1}(\alpha) \le T_1 \le \frac{N}{2} + \sqrt{\frac{N}{2}} \times \text{erfc}^{-1}(\alpha) \quad (14)$$

Accordingly, the condition of Equation (1) for the Monobit Test can be rewritten as:

$$L_1 < T_1 < H_1$$

With:

$$L_1 = \frac{N}{2} - \sqrt{\frac{N}{2}} \times \text{erfc}^{-1}(\alpha), \text{ and} \quad (15)$$

$$H_1 = \frac{N}{2} + \sqrt{\frac{N}{2}} \times \text{erfc}^{-1}(\alpha) \quad (16)$$

The testing device 10 may be then configured to execute the Monobit test on the random number sequence of N bits generated by the RNG 11 and test if the resulting sum $T_1$ is comprised between the lower threshold $L_1$ and the higher $H_1$, which both depend on N and on the error probability $\alpha$.

The comparator 105 will return a resulting value $O_1$ for the Monobit test applied to the N-Bit sequence set to the first value $O_{1,1}$ if the test condition of Equation (1) is not satisfied or a second value $O_{1,2}$ if the test condition of Equation (1) is satisfied.

It should be noted that for N=20000 and $\alpha$=9.6×10$^{-7}$, the condition (1) for the Monobit test is:

9653.54133637<$T_1$<10346.4586636

In contrast, in a conventional approach, the AIS31 Monobit test examines a sequence of 20000 bits by calculating the sum $T_1$ as $T_1 = \sum_{i=1}^{20000} b_i$, and considering a fixed lower threshold and a fixed higher threshold (such thresholds being defined statically independently of the selected value N and of the error probability $\alpha$).

Conventionally, the test fails if $T_1$ falls outside the range defined by the fixed thresholds.

In some embodiments, the set of statistical test 103 may comprise the Poker Test.

In one embodiment, to estimate the condition (1) for the Poker Test, the following statistical parameters used to run the Poker test are defined:

$H_0$: The hypothesis is made that the generated bit sequence is random;

The test statistic $S_{N,M}$ defined as:

$$S_{N,M} = \frac{2^M}{\lfloor \frac{N}{M} \rfloor} \times \left( \sum_{i=0}^{2^M-1} f(i)^2 \right) - \left\lfloor \frac{N}{M} \right\rfloor \quad (17)$$

In Equation (17), N represents the length of the sequence, M represents the length of the contiguous blocks and $f(i)$ denotes the numbers of occurrences of each of the possible M bit values. Given a real number x, $\lfloor x \rfloor$ denotes the integer part of x.

Further, for the Poker Test, the error probability $\alpha$ is defined as $\alpha=1.014\times10^{-6}$.

The Poker test consists in determining the proportion of ones within each M bit block. The frequency of ones in every M bit block should be $$\frac{M}{2}$$

as would be expected for a random sequence. The numbers of occurrences $f(i)$ are normally distributed, so $S_{N,M}$ follows a "chi square" ($\chi^2$) distribution of $2^M-1$ degrees of freedom. A definition of a chi square distribution is provided in Exhibit E1.2.

To determine whether there is a significant difference between the expected frequencies and the observed frequencies, the observation to be tested $\chi_{obs}^2(=S_{N,M})$ can be limited within two critical values of $\chi_{(2^M-1)}^2$ of $2^M-1$ degrees of freedom, given an error probability $\alpha$. In AIS31, the error probability may be chosen equal to 30%×$\alpha$ and to 70%×$\alpha$. Accordingly, the inferior boundary is $\chi_{(2^M-1)}^2(0.3\times\alpha)$ and the superior boundary is $\chi_{(2^M-1)}^2(1-0.7\times\alpha)$, which leads to the general formula of $T_2$, given N and M:

$$\left( \chi_{(2^M-1)}^2(0.3\times\alpha) + \left\lfloor \frac{N}{M} \right\rfloor \right) \times \frac{\lfloor \frac{N}{M} \rfloor}{2^M} \le \quad (18)$$

$$T_2(N,M) \le \left( \chi_{(2^M-1)}^2(1-0.7\times\alpha) + \left\lfloor \frac{N}{M} \right\rfloor \right) \times \frac{\lfloor \frac{N}{M} \rfloor}{2^M}$$

The "chi square" $\chi^2$ distribution has only one parameter which determines its degree of freedom. This means that the boundaries are the same whatever N is, unless M changes.

Accordingly, the condition of Equation (1) for the Monobit Test can be rewritten as:

$$L_2 < T_2 < H_2$$

With the lower threshold $L_2$ and the higher threshold $H_2$ being given defined as follow:

$$L_2 = \left( \chi_{(2^M-1)}^2(0.3\times\alpha) + \left\lfloor \frac{N}{M} \right\rfloor \right) \times \frac{\lfloor \frac{N}{M} \rfloor}{2^M}, \text{ and} \quad (19)$$

$$H_2 = \left( \chi_{(2^M-1)}^2(1-0.7\times\alpha) + \left\lfloor \frac{N}{M} \right\rfloor \right) \times \frac{\lfloor \frac{N}{M} \rfloor}{2^M} \quad (20)$$

As shown by Equation (19) and (20), the lower threshold $L_2$ and the higher threshold $H_2$ also depend on N and on the error probability $\alpha$. In the case of the Poker test, the lower threshold $L_2$ and the higher threshold $H_2$ further depend on M (M represents the length of the contiguous blocks).

The testing device 10 may be accordingly configured to execute the Poker test on the random number sequence of N bits generated by the RNG 11 and test if the resulting sum $T_2$ is comprised between the lower threshold $L_2$ and the higher $H_2$, which both depend on N and on the error probability $\alpha$.

The comparator 105 will return a resulting value $O_1$ for the Poker test applied to the N-Bit sequence set to the first value $O_{1,1}$ if the test condition of Equation (1) is not satisfied or a second value $O_{1,2}$ if the test condition of Equation (1) is satisfied.

For example, according to the testing device and method applied to the Poker test, for M=4 and $\alpha=1.014\times10^{-6}$:

$$\chi_{15}^2(0.3\times1.014\times10^{-6})=1.02613902048$$

$$\chi_{15}^2(1-0.7\times1.014\times10^{-6})=57.3711974356$$

And:

$$1\,562\,820{,}6684439 \leq T_2(N,M) \leq 1\,580\,428{,}499198625$$

In contrast, in a conventional approach, the Poker test:
starts by dividing the sequence of N=20000 bits into a fixed number of 5000 contiguous 4 bit segments, then counts and store the number of occurrences of each of the possible 4 bit values.

Compute the $T_2$ sum:

$$T_2 = \sum_{i=0}^{15} f(i)^2$$

Check if the sum $T_2$ is strictly comprised between a fixed lower threshold and a fixed higher threshold, both defined statically independently of the selected value N and of the target error probability $\alpha$.

Conventionally, the test fails if $T_2$ falls outside the range defined by the fixed thresholds.

In some embodiments, the set of statistical test 103 may comprise the Runs Test.

The purpose of the Runs test is to determine whether ones and zeros are not changing too fast (0101010101) or too slow (0000011111).

A run is defined as a maximal sequence of consecutive bits of either all ones or all zeros.

The incidences of runs (for both consecutive zeros and consecutive ones) of all lengths ($\geq 1$) in the sample stream can be counted and stored. The Runs test is passed if the number of runs that occur (of lengths 1 through 6) is each within the corresponding interval specified below. This holds for both the zeros and ones; that is, all 12 counts must lie in the specified interval. For the purpose of this test, runs of greater than 6 are considered to be of length 6.

$T_3(N,k)$ denotes a run of length k of either the bit 0 or 1, occurring in a sequence of length N.

To estimate the condition according to formula (1) for the runs Test, the following statistical parameters used to apply the Runs test are defined:

$H_0$: The hypothesis is made that the generated bit sequence is random;

S which designates the number of runs of length k denoted $T_3(N, k)$ where n the sequence length; and A error probability $\alpha=k\times10^{-6}$ where $k \in \{3.25; 1.33; 0.85; 0.40; 0.10\}$.

Assuming that the sequence bits are identically distributed, the test statistic $T_3(n, k)$ for the Runs Test is considered normally distributed. The mean of such distribution is $$\mu_{N,k} = \frac{N}{2^{k+2}},$$

because the probability of each run of zeros or ones is the same. Accordingly, in $$\frac{N}{2},$$

there are k-runs or zeros or ones and each bit has a probability of ½ to occur. The mean value expected is thus $$\frac{\frac{N}{2}}{2^{k+1}} = \frac{N}{2^{k+2}}.$$

The sum of all the k-runs if the experience is done an infinite number of times is $$\frac{N}{2}.$$

As a result $$\sum_{k=0}^{+\infty} \mu_{N,k}$$

can be written:

$$\sum_{k=0}^{+\infty} \frac{N}{2^{k+2}} = \frac{N}{4} \sum_{k=0}^{+\infty} \left(\frac{1}{2}\right)^k = \frac{N}{4} \times \frac{1}{1-\frac{1}{2}} = \frac{N}{2} \quad (21)$$

Considering the observation $$S_{obs} = \left|\frac{T_3(N,k) - \mu_{N,k}}{\sqrt{\mu_{N,k}}}\right|,$$

the p-value is:

$$\text{erfc}\left(\left|\frac{T_3(N,k) - \mu_{N,k}}{\sqrt{\mu_{N,k}}}\right|\right) \quad (22)$$

The quantity of Equation (22) may be then compared to the error probability $\alpha$. The Runs test passes if:

$$p\text{-value} \geq \alpha \quad (23)$$

Condition (23) can be rewritten, according to Equation (22):

$$\text{erfc}\left(\left|\frac{T_3(N,k) - \mu_{N,k}}{\sqrt{2 \times \mu_{N,k}}}\right|\right) \geq \alpha \quad (24)$$

Equation (23) can be further formulated as follows:

$$|T_3(N,k) - \mu_{N,k}| \leq \sqrt{2 \times \mu_{N,k}} \times \text{erfc}^{-1}(\alpha) \quad (25)$$

$$\mu_{N,k} - \sqrt{2 \times \mu_{N,k}} \times \text{erfc}^{-1}(\alpha) \leq T_{3(N,k)} \leq \mu_{N,k} + \sqrt{2 \times \mu_{N,k}} \times \text{erfc}^{-1}(\alpha) \quad (26)$$

Accordingly, the condition of Equation (1) for the Run Test for each run k can be rewritten as:

$$L_{3,k} \leq T_{3(N,k)} \leq H_{3,k} \qquad (27)$$

With the lower threshold $L_{3,k}$ and the higher threshold $H_{3,k}$ being given defined as follows:

$$L_{3,k} = \mu_{N,k} - \sqrt{2 \times \mu_{N,k}} \times \mathrm{erfc}^{-1}(\alpha) \qquad (28)$$

$$H_{3,k} = \mu_{N,k} + \sqrt{2 \times \mu_{N,k}} \times \mathrm{erfc}^{-1}(\alpha) \qquad (29)$$

As shown by Equation (28) and (29), the lower threshold $L_{3,k}$ and the higher threshold $H_{3,k}$ also depend on N and on the error probability α (as $\mu_{N,k}=N/2^{k+2}$). The testing device 10 may be accordingly configured to execute the Runs test on the random number sequence of N bits generated by the RNG 11 and test if the resulting sum $T_{3(N,k)}$ for each run of length k is comprised between the lower threshold $L_{3,k}$ and the higher $H_{3,k}$, which both depend on N and on the error probability α. The comparator 105 will return a resulting value $O_1$ for the Runs test applied to the N-Bit sequence set to the first value $O_{1,1}$ if the test condition of Equation (1) is not satisfied for at least one run of length k or a second value $O_{1,2}$ if the test condition of Equation (1) is satisfied for each of the considered runs of length k.

For example, for N=20000, k∈[1, 2, 3, 4, 5, 6] and α=K×10$^{-6}$ where k∈{3.25; 1.33; 0.85; 0.40; 0.10}, the following results indicated in Table 1 are obtained:

TABLE 1

| Length of Run | Required Interval |
|---|---|
| 1 | 2267.04399878-2732.45600122 |
| 2 | 1078.99101268-1420.88398732 |
| 3 | 501.911931832-748.088068168 |
| 4 | 222.906024885-402.125225115 |
| 5 | 89.678247301-222.853002699 |
| 6+ | 89.678247301-222.853002699 |

In contrast, in a conventional approach, a run is defined as a maximal sequence of consecutive bits of either all ones or all zeros, which is part of the 20,000 bit sample stream, the interval being given by the following Table 2:

TABLE 2

| Length of Run | Required Interval |
|---|---|
| 1 | 2267-2733 |
| 2 | 1079-1421 |
| 3 | 502-748 |
| 4 | 223-402 |
| 5 | 90-223 |
| 6+ | 90-223 |

In some embodiments, the statistical tests 103 may include one or more additional statistical tests providing a sum value $T_L$, but instead of testing the sum value $T_L$, the testing device 10 may be configured to test the N-bit sequence by comparing a test parameter determined from the frequency number N and from the error probability α to a threshold.

For example, the set of statistical test 103 may comprise the Longest Run Test.

In a conventional approach, on a sample of 20000 bits, the Longest Run Test is passed if there are NO long runs.

According to an embodiment of the invention, a longest run test may be used to test a bit sequence by determining the length k of a run corresponding to the target error probability α which correspond in the case of the longest run test to the long run probability $P_N(k)$, and then comparing the value k to a threshold. The test is passed if the integer part of the determined value of k is inferior to the run of longest length Long_run_max (⌊k⌋<Long_run_max). Otherwise the test fails.

More specifically, the index k may be determined based on a long run probability $P_N(k)$, representing the probability of a run (zeros or ones) of length longer than or equal to k, appearing in a sequence of N bits is considered.

Figure 2:
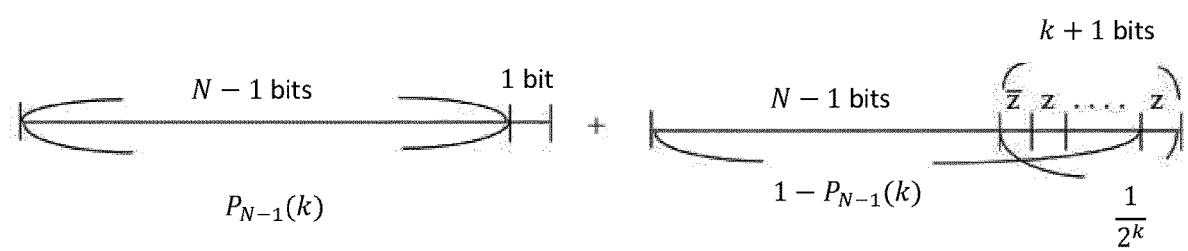
FIG. 2 illustrating the probability of a run used in a Longest Test, according to some embodiments.

$P_N(k)$ may be expressed by the addition of two mutually exclusive event probabilities. One of the event probability represents the probability that the run longer than k appears in N−1 bits and the other event probability represents the probability that no run longer than k appears in N−1 bits but appears in right most k bits of N, as depicted in FIG. 2. This means that:

$$P_N(k) = P_{N-1}(k) + (1 - P_{N-1}(k)) \times \frac{1}{2^k} \qquad (30)$$

$$P_N(k) = \left(1 - \frac{1}{2^k}\right) \times P_{N-1}(k) + \frac{1}{2^k} \qquad (31)$$

Equations (30) and (31) lead to the general expression given k and N:

$$P_N(k) = \begin{cases} 0 & \text{if } N \leq k-1 \\ \frac{1}{2^{k-1}} & \text{if } k = N \\ \left(1 - \frac{1}{2^k}\right) \times P_{N-1}(k) + \frac{1}{2^k} & \text{if } N \geq k+1 \end{cases} \qquad (32)$$

This correspond to an arithmetic-geometric progression of the type:

$$U_N = a \times U_{N-1} + b \qquad (33)$$

Hence:

$$U_N = a^N \times (U_0 - r) + r \qquad (34)$$

In Equation $$(34), \ = \frac{b}{1-a}.$$

Accordingly:

$$P_N(k) = \left(1 - \frac{1}{2^k}\right)^N \times (U_0 - r) + r \qquad (35)$$

In Equation (35), $U_0=0$ and r=1.
Equation (35) can be thus rewritten as:

$$P_N(k) = 1 - \left(1 - \frac{1}{2^k}\right)^N \qquad (36)$$

In Equation (36), k can be accordingly found as follows:

$$\ln(P_N(k)) = N \times \ln\left(1 - \frac{1}{2^k}\right) \quad (36.1)$$

$$e^{\frac{\ln(P_N(k))}{N}} = 1 - \frac{1}{2^k} \quad (36.2)$$

$$\ln\left(1 - e^{\frac{\ln(P_N(k))}{N}}\right) = -k \times \ln(2) \quad (36.3)$$

$$k = -\log_2\left(1 - e^{\frac{\ln(P_N(k))}{N}}\right) \quad (36.4)$$

As $P_N(k) = \alpha$, equation 36.4 may be rewritten as a function of N and $\alpha$:

$$k = -\log_2\left(1 - e^{\frac{\ln(\alpha)}{N}}\right) \quad (37)$$

For example, for N=2000 and $P_N(k) = 10^{-6}$, $\lfloor k \rfloor = 34$

The table below provides examples of test parameters calculated for the Monobit Test (T1), the Poker Test (T2), the Runs Test, and the Longest run Test, according to the preceding equations which provides the lower/higher thresholds Li and Hi as a function of N and $\alpha$ (for T1, T2, T3) or the longest run parameter k as a function of a for N$\in$ {5000, 10000, 20000, 40000}, the value N=20000 being the fixed value conventionally used for testing a bit sequence generated by the RNG 11 (as defined by the standard NIST FIPS 140-2 and BSI AIS 31). In the exemplary table below, a given value of $\alpha$ is chosen for illustrative purpose, although $\alpha$ can be varied:

In step 310, for each statistical test sum $T_1$ (or $T_{i,k}$ for each run k of the runs test) obtained for a statistical test (block 308), a lower threshold $L_i$ (or $L_{i,k}$ for each run k of the runs test) and a higher threshold $H_i$ (or $H_{i,k}$ for each run k of the runs test) are determined in association with the statistical test sum, the lower threshold and the higher threshold depending on N and on the error probability $\alpha$.

In step 312, condition (1) is tested for each statistic test sum $T_i$ (or $T_{i,k}$ for each run k of the runs test) provided by each statistical test, using the associated lower threshold $L_i$ (or $L_{i,k}$) and the associated higher threshold $H_i$ (or $H_{i,k}$).

In step 314, if at least one statistical test does not satisfy condition 1 (block 312), the random bit sequence may be rejected. Otherwise, steps 310 and 312 are repeated for the other statistical tests, in not all statistical test have been processed (step 313). In step 316, the random bit sequence is validated and the N-random bits may be delivered to the target system 12 if all the statistical test sums meet condition 1.

Exhibit E1.3 provides a testing method for testing a bit sequence generated by a RNG, as random bits arrive, in pseudo-code format, according to one embodiment, using the statistical tests:
Monbit Test (T1);
Poker Test (T2);
Runs Test (T3);
Longest Run test (T4).

The testing method of Exhibit E.1.3 has an optimized latency and is particularly adapted to testing a N-bit sequence in a testing device 10 embedded in a chip.

Embodiments of the invention accordingly enable a dynamic selection of the number N of raw bits to test given

TABLE 3

| Test | N = 5000 | N = 10;000 | N = 20;000 | N = 40;000 |
|---|---|---|---|---|
| T1 | [2327, 2673] | [4755, 5245] | [9654, 10;346] | [19;510, 20;489] |
| T2 | [1.03, 57.37] | [1.03, 57.37] | [1.03, 57.37] | [1.03, 57.37] |
| T3 | Run of length 1: [508, 741] | Run of length 1: [1085, 1414] | Run of length 1: [2267, 2733] | Run of length 1: [4671, 5329] |
|  | Run of length 2: [227, 398] | Run of length 2: [504, 746] | Run of length 2: [1079, 1421] | Run of length 2: [2258, 2742] |
|  | Run of length 3: [95, 218] | Run of length 3: [225, 400] | Run of length 3: [502, 748] | Run of length 3: [1076, 1424] |
|  | Run of length 4: [33, 123] |  | Run of length 4: [223, 402] |  |
|  | Run of length 5: [6, 72] | Run of length 4: [93, 220] | Run of length 5: [90, 223] | Run of length 4: [498, 752] |
|  | Run of length 6+: [6, 72] | Run of length 5: [31, 125] | Run of length 6+: [90, 223] | Run of length 5: [218, 407] |
|  |  | Run of length 6+: [31, 125] |  | Run of length 6+: [218, 407] |
| T4 | 32 | 33 | 34 | 35 |

Figure 3:
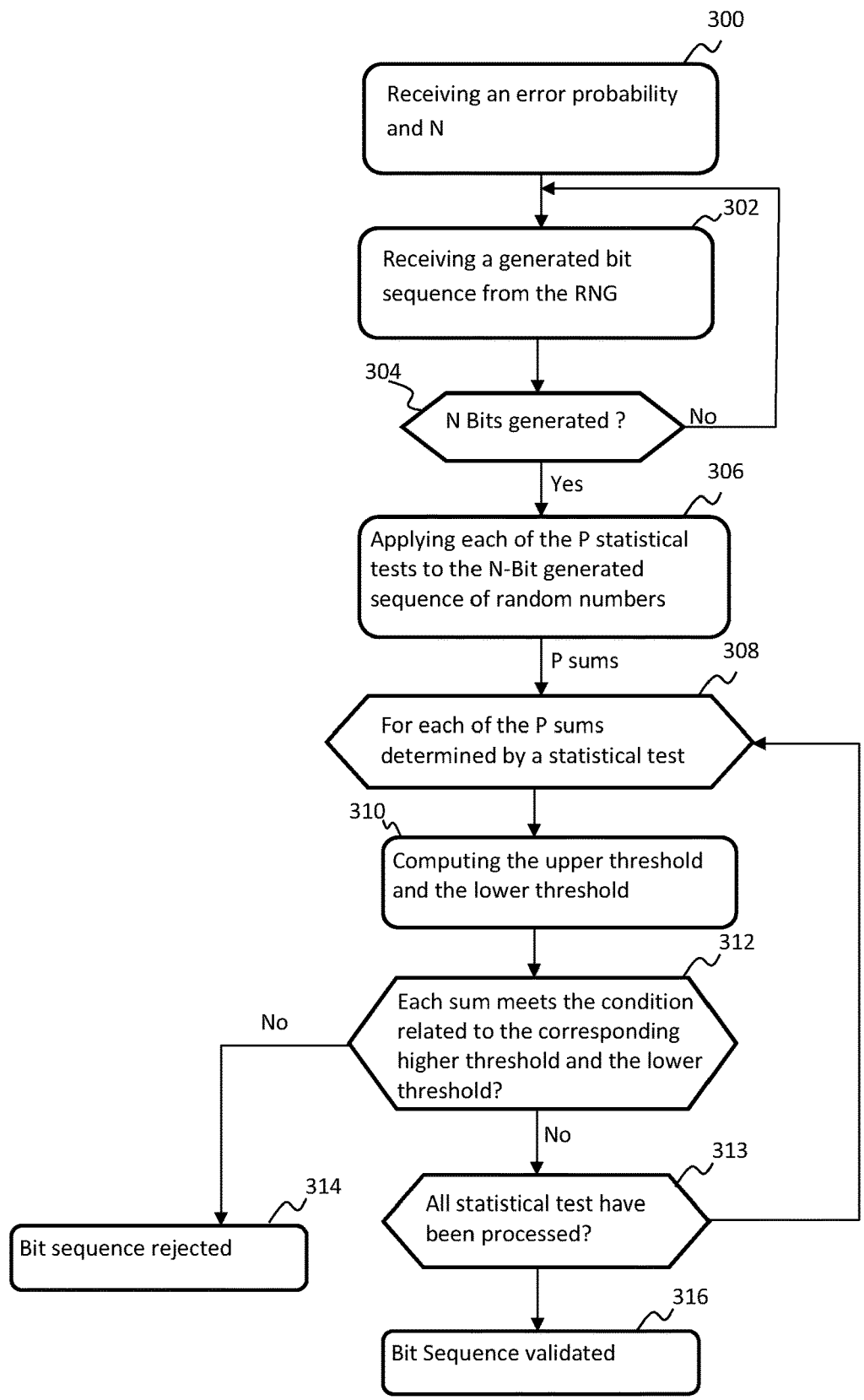
FIG. 3 is a flowchart depicting a method of testing a random number sequence generated by a Random Number Generator, according to some embodiments.

FIG. 3 is a flowchart of the method of testing a random bit sequence generated by a RNG 11, using a set of tests providing a sum test Ti (such as T1, T2 and T3) for which the condition (1) is checked, the condition being defined by a lower and higher thresholds Li and Hi, which both depend on N and $\alpha$, according to some embodiments.

In step 300, the error probability and the bit sequence length N are received.

In step 302, generation of a random number sequence by the RNG 11 is detected.

In step 304, it is detected if N Bits have been generated by the RNG 11.

If so, each of the P statistical tests 103 are applied to the k-bit random number sequence received from the RNG 11 in step 306. Otherwise, the process returns to step 302. The execution of each statistical test provides at least one sum Ti. In the case of a runs test, each considered run k provides a sum $T_{i,k}$.

the targeted debit/latency. They also provide a dynamic error probability r given the targeted application and fully controllable latency throughout all stages (in contrast to the prior art which, by waiting for a fixed number of raw bits, generate uncontrollable latency).

The embodiments of the invention apply to both embedded statistical tests (the tests are performed within the chip of the system or device using the random number sequence) and online statistical tests.

In some application requiring fast processing, the value of N can be chosen to be smaller than 20000 so that the overall time needed to text a bit sequence. In contrast, for applications requiring that the generated random number be evaluated more strictly, in order to reduce the number of false positive detections, the sequence size N can be increased.

The embodiments of the invention thus enable a flexible adjustment of N in accordance with the needs of the application.

The testing device according to the embodiments of the invention may be used in various applications such as:
- simulation applications which simulate and model complex phenomena (e.g. in Monte Carlo integration used in finance and in engineering fields);
- in random sampling applications which select random samples from larger data sets;
- in cryptographic applications such as authentication, signing, encryption, digital signature generation, encryption key generation systems, or internet encryption protocols applications;
- in chip manufacturing and seeding of device-specific keys, e.g. for Near Field Communication or device IDs;
- In machine learning and statistical learning applications (true random number generators may be used to obtain samples from random distributions).

Exemplary target systems 12 include cryptographic systems that implement cryptographic functions based on one or more cryptographic keys to ensure data and/or signals security, authentication, protection, and privacy such as:
- smart cards, devices that store keys such as wallets, smart cards readers such as Automated Teller Machines (ATM) used for example in financial applications;
- digital electronic devices such as RFID tags;
- embedded secure elements;
- computers (e.g. desktop computers and laptops), tablets;
- routers, switches, printers;
- mobile phones such as smart-phones, base stations, relay stations, satellites;
- Internet of Thing (IoT) devices, robots, drones; and
- recorders, multimedia players, mobile storage devices (e.g. memory cards and hard discs) where logon access monitored by cryptographic mechanisms, etc.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

In particular, it should be noted that the statistical tests 103 may be tested in any order, sequentially or in parallel.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. In particular, it should be noted that the invention is not limited to statistical test of the AIS31 test set and may use other types of statistical tests used to test sequences generated by a RNG 11, such as for example:
- other tests from the AIS31 set including for instance the auto-correlation test (test 5), the uniform distribution test (test 6), the homogeneity test or the comparative test for multinomial distributions (test 8), the entropy estimation test (test 8).
- tests from the NIST test suite, according for example to the NIST SP800-22 test suite, such as for example the Serial test, the Frequency (Monobit) test, etc.

Exhibit E1

Definitions

E1.1. Normal Distribution

A (continuous) random variable X has a normal distribution with mean $\mu$ and variance $\sigma^2$ if its probability density function is:

$$f(x) = \frac{1}{\sigma\sqrt{2\pi}} \times e^{-\frac{(x-\mu)^2}{2\sigma^2}} \; \forall x \in ]-\infty, +\infty[$$

The density function of a continuous random variable X satisfies:
$f(x) \geq 0$ for all $x \in ]-\infty, +\infty[$
$\int_{-\infty}^{+\infty} f(x)dx = 1$
For all $a, b \in ]-\infty, +\infty[$, $P(a<X<b) = \int_a^b f(x)dx$ E1.2 The "Chi Square" $\chi^2$ Distribution The $\chi^2$ distribution may be used to compare the goodness-of-fit of the observed frequencies of events to their expected frequencies under the hypothesized distribution. The $\chi^2$ distribution with k degrees of freedom arises when the squares of k independent random variables having standard normal distributions are summed.

Let $k \geq 1$ be an integer. A continuous random variable X has a $\chi^2$ distribution of k degrees of freedom if its density function is:

$$f(x) = \begin{cases} \frac{1}{\Gamma\left(\frac{k}{2}\right) 2^{\frac{k}{2}}} x^{\frac{k}{2}-1} e^{-\frac{x}{2}}, & 0 \leq x \leq \infty \\ 0, & x < 0 \end{cases}$$

where $\Gamma(x)$ is the gamma function defined for $t>0$ as:

$$g(t) = \int_0^\infty x^{t-1} e^{-x} dx$$

---

E.1.3: Testing Method
Algorithm 1: Online computation of T1, T2, T3 and T4 tests

--- input : A bit sequence $(b_i)_{1 \leq i \leq N}$ to be tested
output: Four Boolean numbers, which indicate which test is passed/failed

---

|  | // Tests initialization |
|---|---|
| // Statistics | |
| 1  sum ← 0 | // For the T1 test |
| 2  f[16] ← {0,0,0,0,0,0,0,0,0,0,0,0,0,0,0,0} | // For the T2 test |
| 3  run[6][2] ← {{0,0,0,0,0,0}, {0,0,0,0,0,0}} | // For the T3 test |
| 4  long_run_max ← 0 | // For the T4 test |
| // Ancillary accumulators | |

-continued

E.1.3: Testing Method
Algorithm 1: Online computation of T1, T2, T3 and T4 tests

| 5 prev_b ← 1 (that is, neither 0 nor 1) | // Detecting run ends |
| 6 poker_current ← 0 | // Poker test bin |
| 7 long_run_current ← 0 | // Length of current run |

// Accumulators updated 8  for i ∈ {1, . . . , N} do
9  | sum=+ $b_i$
10 | $i_4$ ← i mod 4
11 | poker_current+= $b_i \times 2^{i_4}$
12 | if $i_4$ = 0 then
13 | | if[poker_current]+= 1
14 | ⌊ poker_current ← 0
15 | if $b_i$ = prev_b then
16 | | long_run_current+= 1
17 | else                                          // Current run ends
18 | | if long_run_ < 6 then
19 | | | run[prev_b][long_run_current− 1]+= 1
20 | | else
21 | | ⌊ run[prev_b][6]+= 1
22 | | if long_run_max < long_run_current then
23 | | ⌊ long_run_max ← long_run_current
24 | ⌊ long_run_current ← 0
25 ⌊ prev_b ← $b_i$ // Finalization 26 return $T1: \left| \text{sum} - \frac{N}{2} \right| \leq \sqrt{\frac{N}{2}} \times \text{erfc}^{-1}(\alpha)$ (recall Eqn. (1))

$T2: \chi^2_{2^M-1}(0.3 \times \alpha) \leq \frac{2^M}{N/M}\left(\sum_{i=0}^{2^M-1}(f[i])^2\right) - \frac{N}{M} \leq \chi^2_{2^M-1}(1 - 0.7 \times \alpha)$ (recall Eqn. (2))

$T3: \left| \text{run}[b][m] - \frac{N}{2^{k+2}} \right| \leq \sqrt{\frac{N}{2^k+1}} \times \text{erfc}^{-1}(\alpha)$, for all $b \in \{0, 1\}$ and $m \in \{0, 1, 2, 3, 4, 5\}$ (recall Eqn. (3))

$T4: \text{long\_run\_max} > -\log_2(1 - (1-\alpha)^{1/N})$. (recall Eqn. (4))

The invention claimed is:

1. A device for testing a bit sequence generated by a Random Number Generator, wherein the device is configured to apply one or more statistical tests to the bit sequence, in response the detection of N bits generated by the Random number generator, each statistical test being configured to test randomness in said N bits generated by the Random number generator, each statistical test providing at least one sum value derived from the bits of said sequence, the testing device comprising:
   a comparator for comparing at least one test parameter related to each statistical test to one or more thresholds;
   a validation unit configured to determine if said bit sequence is valid depending on the comparison made by the comparator for each statistical test;
   wherein at least one of said test parameter and said at least one threshold is determined from N and from a target error probability;
   wherein said at least one test parameter corresponds to a sum value,
   the device further comprising:
   a threshold determination unit (101) configured to determine, for each statistical test, at least one threshold pair comprising a lower threshold and a higher threshold, the lower threshold and the higher threshold depending on the parameter N and on a target error probability,
   wherein the comparator (102) is configured to compare, for each statistical test, each sum value with the associated lower threshold and higher threshold.

2. The device of claim 1, wherein the comparator is configured to output a validation bit for a statistical test, if each sum value is strictly superior to the associated lower threshold and strictly inferior to the higher threshold.

3. The device of claim 2, wherein the validation unit is configured to reject the bit sequence if at least one sum value for a statistical test is inferior or equal to the associated lower threshold or superior or equal to the corresponding higher threshold.

4. The device of claim 1, wherein the statistical tests comprise the AIS Monobit Test which provides a sum value $T_1$, the corresponding lower threshold $L_1$ and the higher threshold $H_1$ being equal to:

$$L_1 = \frac{N}{2} - \sqrt{\frac{N}{2}} \times \text{erfc}^{-1}(\alpha), \text{ and}$$

$$H_1 = \frac{N}{2} + \sqrt{\frac{N}{2}} \times \text{erfc}^{-1}(\alpha),$$

with α representing the target error probability.

5. The device of claim 1 wherein the statistical tests comprise the AIS Poker Test which provide a sum value $T_2$, the corresponding lower threshold $L_2$ and the higher threshold $H_2$ being equal to:

$$L_2 = \left(\chi^2_{(2^M-1)}(0.3 \times \alpha) + \left\lfloor \frac{N}{M} \right\rfloor\right) \times \frac{\left\lfloor \frac{N}{M} \right\rfloor}{2^M}, \text{ and}$$

$$H_2 = \left(\chi^2_{(2^M-1)}(1 - 0.7 \times \alpha) + \left\lfloor \frac{N}{M} \right\rfloor\right) \times \frac{\left\lfloor \frac{N}{M} \right\rfloor}{2^M},$$

with M representing the length of the contiguous blocks in the bit sequence and α representing the error probability.

6. The device of claim 1, wherein the statistical tests comprise the AIS runs Test which provides a sum value $T_{3(N,k)}$ for each run of length k, the lower threshold $L_{3,k}$ and the higher threshold $H_{3,k}$ for each run of length k being equal to:

$$L_{3,k} = \mu_{N,k} - \sqrt{2 \times \mu_{N,k}} \times \text{erfc}^{-1}(\alpha)$$

$$H_{3,k} = \mu_{N,k} + \sqrt{2 \times \mu_{N,k}} \times \text{erfc}^{-1}(\alpha),$$

with α representing the target error probability and $$\mu_{N,k} = \frac{N}{2^{k+2}}.$$

7. The device of claim 1, wherein the bit sequence length N is changed between one or more clock cycles.

8. The device of claim 1, wherein a new value for the error probability and the number N may be received at different times or simultaneously.

9. A device for testing a bit sequence generated by a Random Number Generator, wherein the device is configured to apply one or more statistical tests to the bit sequence, in response the detection of N bits generated by the Random number generator, each statistical test being configured to test randomness in said N bits generated by the Random number generator, each statistical test providing at least one sum value derived from the bits of said sequence, a statistical test comprising several runs, a run having a length k, wherein the testing device comprises:
   a comparator for comparing at least one test parameter related to each statistical test to a threshold;
   a validation unit configured to determine if said bit sequence is valid depending on the comparison made by the comparator for said each statistical test;
   wherein said at least one test parameter is a parameter related to the statistical test and determined from N and from a target error probability, and
   wherein the test parameter is the integer part of the length of a run.

10. The device of claim 9, wherein the statistical tests comprises the AIS Longest Run Test, the test parameter corresponding to the run length k being determined according to the following equation:

$$k = -\log_2\left(1 - e^{\frac{\ln(\alpha)}{N}}\right),$$

where α designates the long run probability, wherein said threshold is the longest run length.

11. A system implemented on at least one integrated circuits, said system comprising a device using a random bit sequence generated by a random number generator, wherein said device further comprises a testing device according to claim 1 for testing each random bit sequence generated by said random number generator.

12. A method for testing a bit sequence generated by a Random Number Generator, wherein the method comprises applying one or more statistical tests to the bit sequence, in response the detection of N bits generated by the Random number generator, each statistical test being configured to test randomness in said N bits generated by the Random number generator (11), each statistical test providing at least one test parameter from the bits of said sequence, a statistical test comprising several runs, a run having a length k the testing method comprising:
   comparing at least one test parameter related to each statistical test to one or more thresholds;
   determining if said bit sequence is valid depending on the comparison performed for each statistical test in said comparing step;
   wherein said at least one test parameter corresponds to a sum value, the method further comprising:
   determining, for each statistical test, at least one threshold pair comprising a lower threshold and a higher threshold, the lower threshold and the higher threshold depending on the parameter N and on a target error probability,
   wherein the comparison step comprises, for each statistical test, comparing each sum value with the associated lower threshold and higher threshold.

13. A method for testing a bit sequence generated by a Random Number Generator, wherein the method comprises applying one or more statistical tests to the bit sequence, in response the detection of N bits generated by the Random number generator, each statistical test being configured to test randomness in said N bits generated by the Random number generator (11), each statistical test providing at least one test parameter from the bits of said sequence, the testing method comprising:
   comparing at least one test parameter related to each statistical test to a threshold;
   determining if said bit sequence is valid depending on the comparison made for said each statistical test;
   wherein said at least one test parameter is a parameter related to the statistical test and determined from N and from a target error probability,
   wherein the test parameter is the integer part of the length of a run.

14. The method of claim 13, wherein the statistical tests comprises the AIS Longest Run Test, the test parameter corresponding to the run length k being determined according to the following equation:

$$k = -\log_2\left(1 - e^{\frac{\ln(\alpha)}{N}}\right)$$

where α designates the long run probability, wherein said threshold is the longest run length.

* * * * *